US012593279B2

(12) United States Patent
    Ikeda

(10) Patent No.: US 12,593,279 B2
(45) Date of Patent: Mar. 31, 2026

(54) COMMUNICATION DEVICE AND CONTROL METHOD THEREOF, AND STORAGE MEDIUM

(71) Applicant: CANON KABUSHIKI KAISHA, Tokyo (JP)

(72) Inventor: Nobuhiro Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 660 days.

(21) Appl. No.: 17/949,350

(22) Filed: Sep. 21, 2022

(65) Prior Publication Data

US 2023/0102066 A1      Mar. 30, 2023

(30) Foreign Application Priority Data

Sep. 28, 2021    (JP) ................................. 2021-158399

(51) Int. Cl.
    *H04W 52/02*      (2009.01)
    *H04W 76/15*      (2018.01)
    *H04W 84/12*      (2009.01)

(52) U.S. Cl.
    CPC ....... *H04W 52/0225* (2013.01); *H04W 76/15* (2018.02); *H04W 84/12* (2013.01)

(58) Field of Classification Search
    CPC ......... H04W 52/0212; H04W 52/0219; H04W 52/0225; H04W 76/15; H04W 84/12
    See application file for complete search history.

(56) References Cited

U.S. PATENT DOCUMENTS

| | | | |
|---|---|---|---|
| 8,611,268 B1 * | 12/2013 | Thandaveswaran | ......................... H04W 52/0206 455/552.1 |
| 9,392,545 B2 * | 7/2016 | Preiszler | ........... H04W 52/0235 |
| 10,021,646 B2 | 7/2018 | Takahashi et al. | |
| 10,278,128 B2 | 4/2019 | Takahashi et al. | |
| 10,303,241 B2 * | 5/2019 | Li | .......................... G06F 1/3296 |
| 10,506,655 B2 * | 12/2019 | Araki | .................... G06F 3/1292 |
| 2018/0364795 A1 * | 12/2018 | Li | ........................... G06F 16/23 |

(Continued)

FOREIGN PATENT DOCUMENTS

JP      2021-141553 A      9/2021

OTHER PUBLICATIONS

Inoue, Y. et al., "Latest Trends in Next-Generation Wireless LAN Standardization in the IEEE 802.11 Working Group" NTT Technology Journal (Dec. 2020) pp. 1-6, vol. 32, No. 12, partial English translation attached.

(Continued)

*Primary Examiner* — Alpus Hsu
(74) *Attorney, Agent, or Firm* — Carter, DeLuca & Farrell LLP

(57)            ABSTRACT
A communication device establishes multiple wireless links which are used in wireless communication compliant with an IEEE 802.11 series standard and which are used in data communication with a partner device. The communication device collects, from the partner device, power saving information related to power saving operations that respectively correspond to the multiple wireless links and that are performed in the partner device, before a start of frame exchange for a next data communication with the partner device, and using a wireless link, among the multiple wireless links, that is in the enabled state.

10 Claims, 10 Drawing Sheets

(56)　　　　　　References Cited

U.S. PATENT DOCUMENTS

| | | | |
|---|---|---|---|
| 2020/0163141 A1 * | 5/2020 | Hsu | H04W 52/0209 |
| 2021/0360532 A1 * | 11/2021 | Jiang | H04W 52/0229 |
| 2022/0240333 A1 * | 7/2022 | Jang | H04L 69/24 |
| 2022/0346149 A1 | 10/2022 | Ikeda | |
| 2022/0386321 A1 | 12/2022 | Ikeda | |

OTHER PUBLICATIONS

Hsu, F. et al., "Link Enablement Considerations" IEEE 802.11-20/0280r2, Mar. 8, 2020, MediaTek (Mar. 2020) pp. 1-9.
Notice of Reasons for Refusal issued by the Japanese Patent Office on Aug. 4, 2025 in corresponding JP Patent Application No. 2021-158399, with English translation.

* cited by examiner

F I G. 1
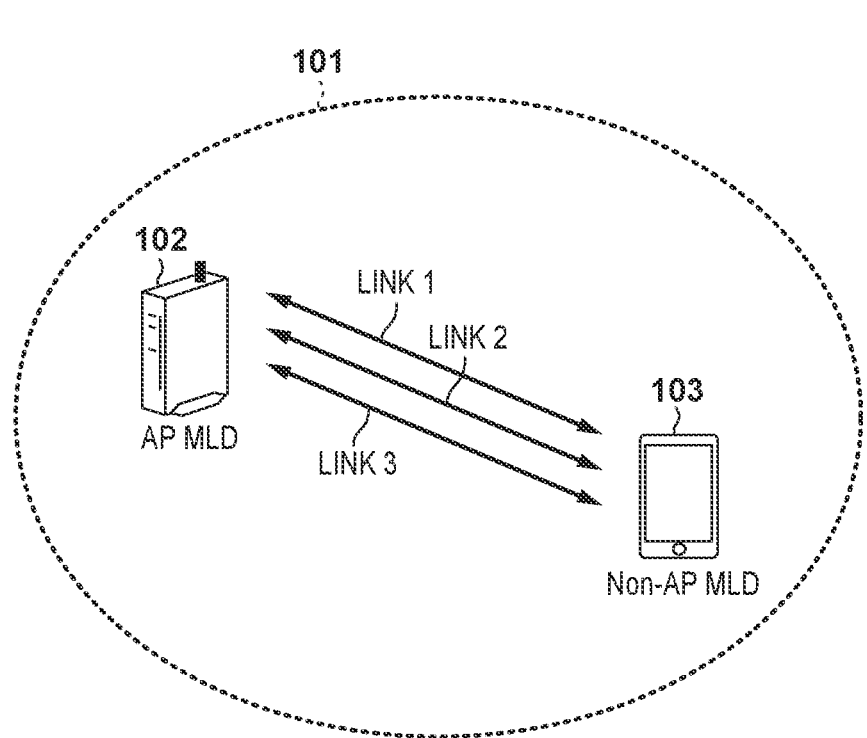
F I G. 2
| | | | COMMUNICATION DEVICE | |
|---|---|---|---|---|
| 201 | 202 | 203 | | |
| STORAGE UNIT | CONTROL UNIT | FUNCTION UNIT | | |
| INPUT UNIT | OUTPUT UNIT | COMMUNICATION UNIT | ANTENNA | |
| 204 | 205 | 206 | 207 | |

F I G. 3
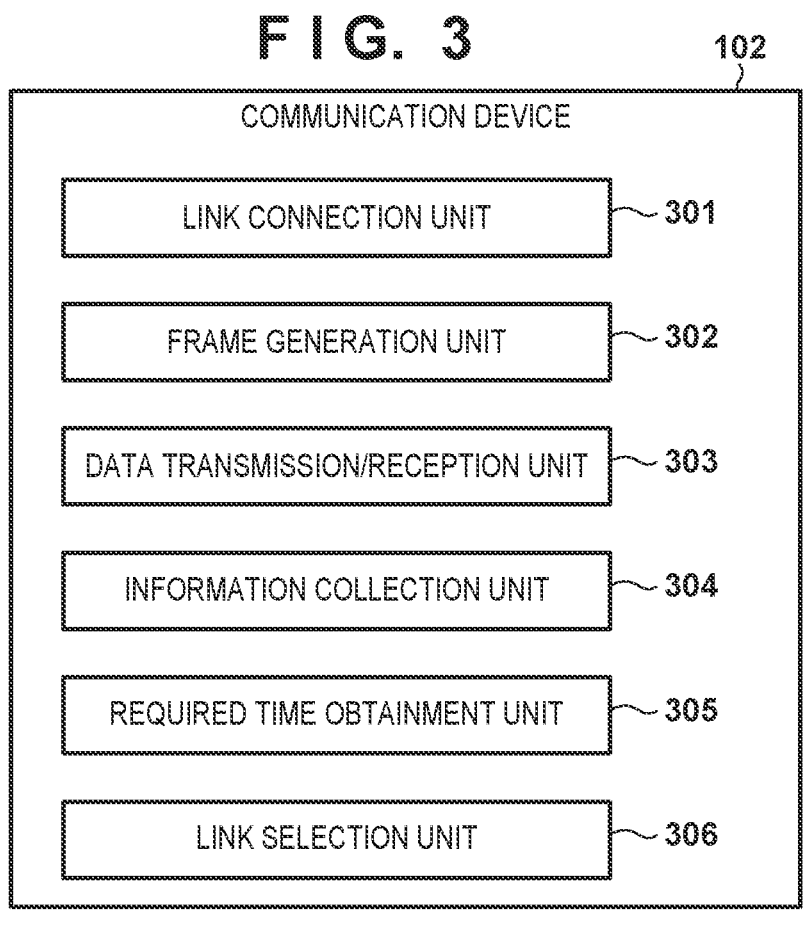
102
COMMUNICATION DEVICE
| LINK CONNECTION UNIT | ~ 301 |
| FRAME GENERATION UNIT | ~ 302 |
| DATA TRANSMISSION/RECEPTION UNIT | ~ 303 |
| INFORMATION COLLECTION UNIT | ~ 304 |
| REQUIRED TIME OBTAINMENT UNIT | ~ 305 |
| LINK SELECTION UNIT | ~ 306 |
F I G. 4
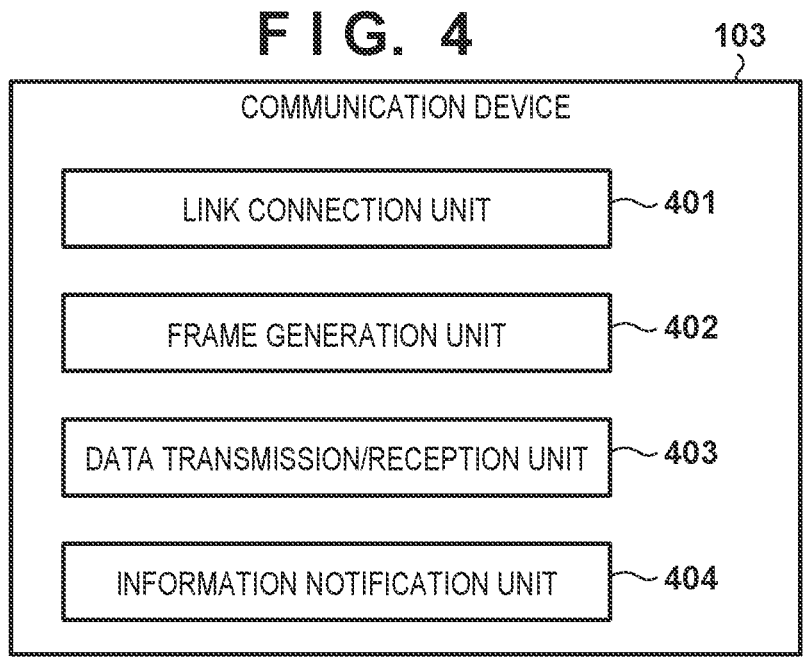
103
COMMUNICATION DEVICE
| LINK CONNECTION UNIT | ~ 401 |
| FRAME GENERATION UNIT | ~ 402 |
| DATA TRANSMISSION/RECEPTION UNIT | ~ 403 |
| INFORMATION NOTIFICATION UNIT | ~ 404 |

FIG. 6

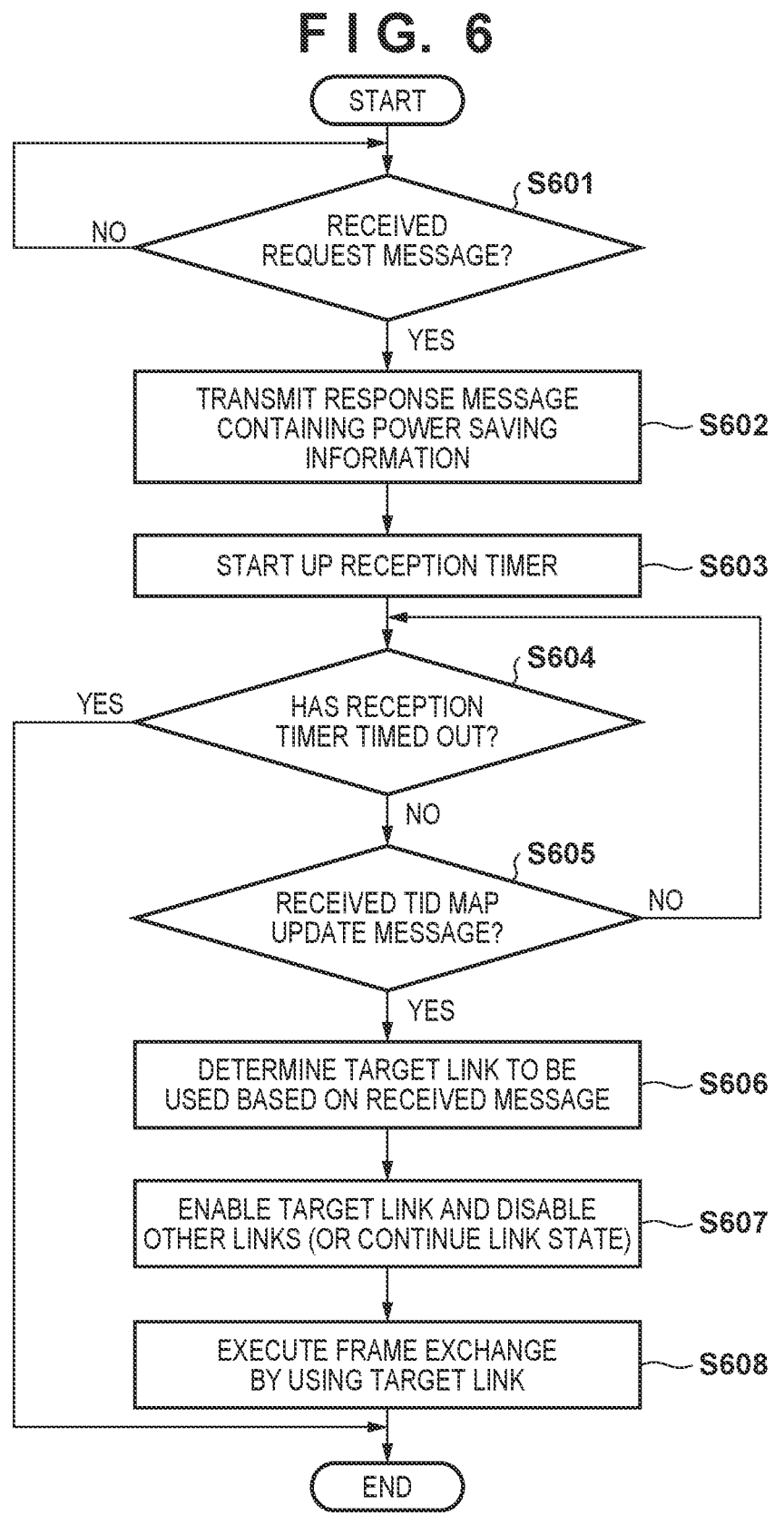

START

S601 — RECEIVED REQUEST MESSAGE?

NO

YES

TRANSMIT RESPONSE MESSAGE CONTAINING POWER SAVING INFORMATION — S602

START UP RECEPTION TIMER — S603

S604 — HAS RECEPTION TIMER TIMED OUT?

YES

NO

S605 — RECEIVED TID MAP UPDATE MESSAGE?

NO

YES

DETERMINE TARGET LINK TO BE USED BASED ON RECEIVED MESSAGE — S606

ENABLE TARGET LINK AND DISABLE OTHER LINKS (OR CONTINUE LINK STATE) — S607

EXECUTE FRAME EXCHANGE BY USING TARGET LINK — S608

END

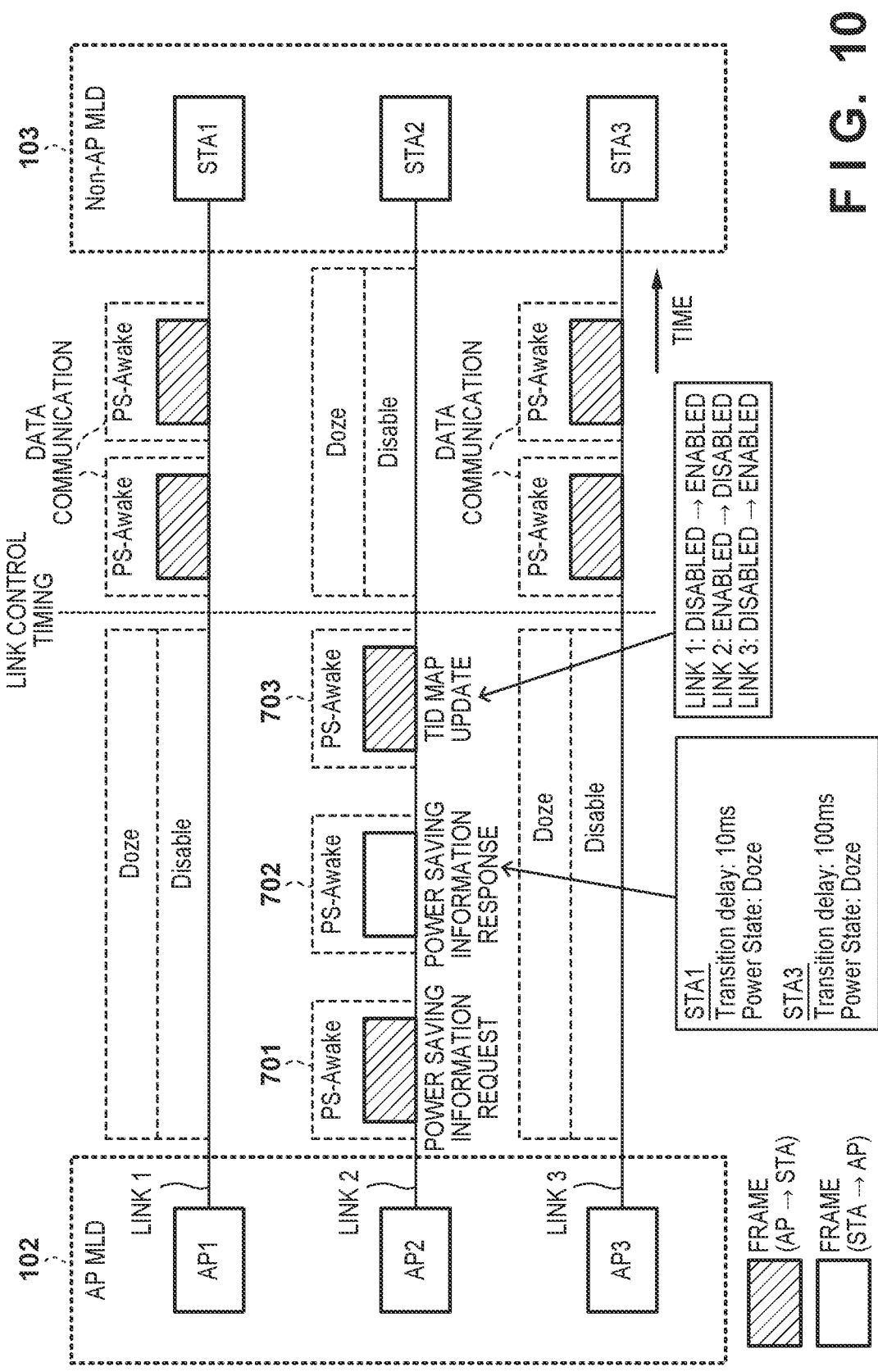
F I G. 10

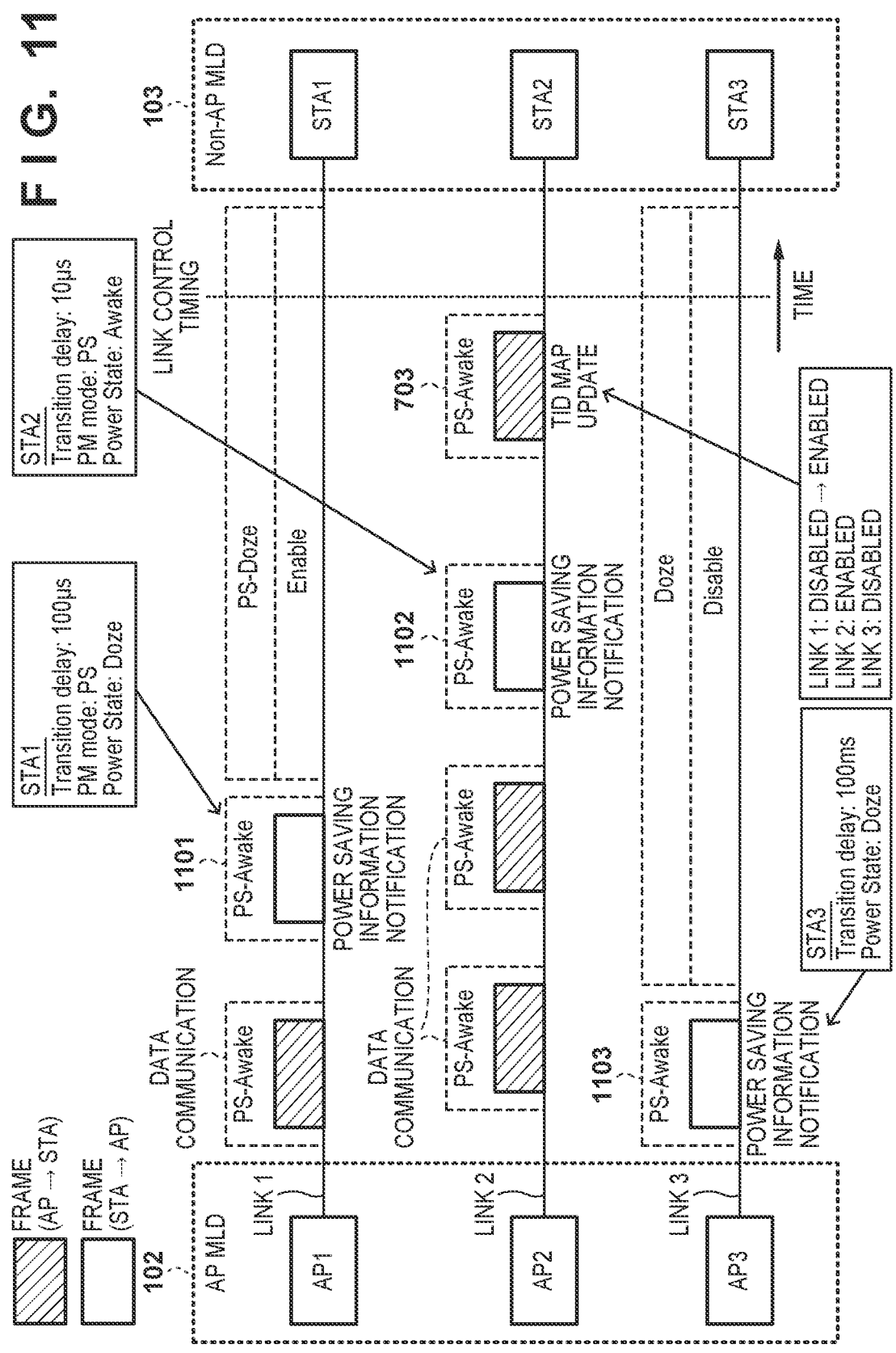
F I G. 11

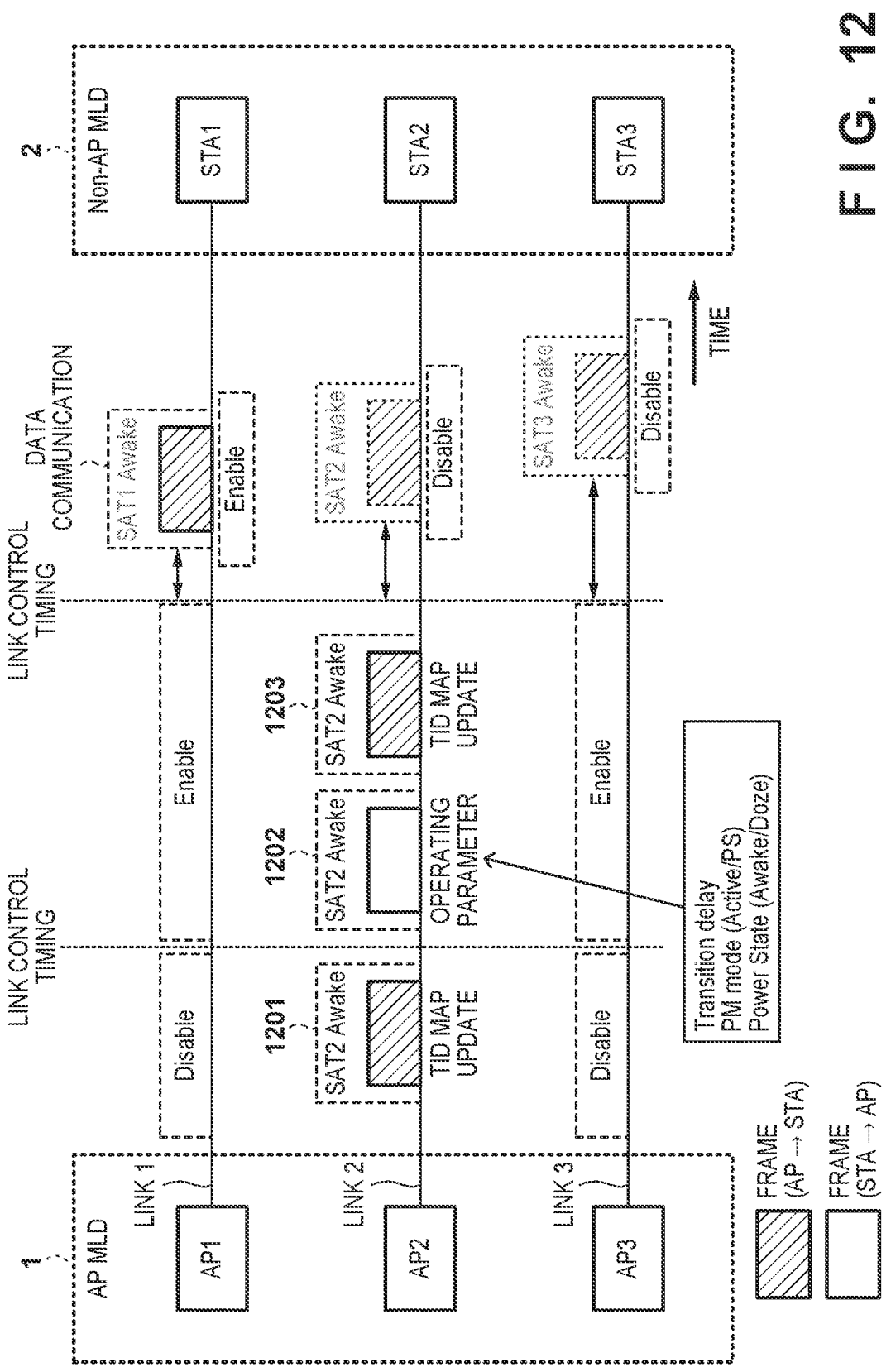
F I G. 12

COMMUNICATION DEVICE AND CONTROL METHOD THEREOF, AND STORAGE MEDIUM

BACKGROUND OF THE INVENTION

Field of the Invention

The present invention relates to a communication device that performs data communication using multiple wireless links, a control method thereof, and a storage medium.

Description of the Related Art

The IEEE 802.11 series standards are known as the wireless local area network ("wireless LAN" or "WLAN") communication standards developed by the Institute of Electrical and Electronics Engineers (IEEE). IEEE 802.11 series standards include standards such as the IEEE 802.11a/b/g/n/ac/ax standards and the like. The IEEE is considering developing a new IEEE 802.11be standard to further increase throughput and improve frequency utilization efficiency.

With the IEEE 802.11be standard, the introduction of multi-link transmission techniques is being considered (Yasuhiko Inoue and Akira Kishida, "Latest Trends in Next-Generation Wireless LAN Standardization in the IEEE 802.11 Working Group". NTT Technology Journal. Vol. 32, No. 12, December 2020). Multi-link transmission is a technique in which one access point (AP)-side communication device (a multi-link device, or MLD) communicates with one station (STA)-side communication device (MLD) by establishing multiple links over multiple different frequency channels.

In connection with the standardization of the IEEE 802.11be standard, having communication devices notify each other of information related to power saving operations corresponding to a wireless link that is switched from a disabled link to an enabled link using a TID-mapping update (MediaTek Inc., "Link Enablement Considerations". IEEE 802.11-20/0280r2, Mar. 8, 2020) is being considered. Note that an "enabled link" is a wireless link in a state in which frame exchange is possible, and a "disabled link" is a wireless link in a state in which frame exchange is not possible. STAs that support multi-link communication also support power-saving modes based on the state of the wireless link. The time required for a wireless hardware unit of an STA to return from a power-saving mode and become capable of frame exchange differs depending on the power-saving level of that STA.

If a wireless link corresponding to an STA for which the aforementioned required time is selected as the wireless link to be used for frame exchange for the next instance of data communication, the time required for the STA to return from the power-saving mode (switching the wireless link to an enabled state) may become longer. This can cause failures or delays in data transmission from the AP-side communication device to the STA-side communication device.

In the processing described above, each wireless link is temporarily switched to an enabled link using a TID-mapping update in order for the AP-side communication device to collect power saving information related to the power saving operations of the STA corresponding to each wireless link. In this case, the wireless link not used for data communication is also switched to the enabled state for the sole purpose of collecting (making a notification of) the power saving information, which may cause the STA to return from the power-saving mode. As a result, sufficient power saving cannot be achieved in the STA-side communication device.

SUMMARY OF THE INVENTION

Accordingly, the present invention provides a technique that enables a communication device which performs multi-link communication to more efficiently collect power saving information related to power saving operations in a partner device.

According to one aspect of the present invention, there is provided a communication device comprising: a connection unit configured to establish multiple wireless links which are used in wireless communication compliant with an IEEE 802.11 series standard and which are used in data communication with a partner device, the connection unit being capable of switching a state of each established wireless link between an enabled state, in which frames can be exchanged over the wireless link, and a disabled state, in which frames cannot be exchanged over the wireless link; and a collection unit configured to collect, from the partner device, power saving information related to power saving operations that respectively correspond to the multiple wireless links and that are performed in the partner device, before a start of frame exchange for a next data communication with the partner device, and using a wireless link, among the multiple wireless links, that is in the enabled state.

According to another aspect of the present invention, there is provided a communication device comprising: a connection unit configured to establish multiple wireless links which are used in wireless communication compliant with an IEEE 802.11 series standard and which are used in data communication with a partner device, the connection unit being capable of switching a state of each established wireless link between an enabled state, in which frames can be exchanged over the wireless link, and a disabled state, in which frames cannot be exchanged over the wireless link; and a notification unit configured to notify the partner device of power saving information related to power saving operations that respectively correspond to the multiple wireless links and that are performed in the communication device, before a start of frame exchange for a next data communication with the partner device, and using a wireless link, among the multiple wireless links, that is in the enabled state.

Further features of the present invention will become apparent from the following description of exemplary embodiments (with reference to the attached drawings).

BRIEF DESCRIPTION OF THE DRAWINGS

FIG. 1 is a diagram illustrating an example of the configuration of a network.

FIG. 2 is a block diagram illustrating an example of the hardware configuration of a communication device.

FIG. 3 is a block diagram illustrating an example of the functional configuration of a communication device (AP-MLD).

FIG. 4 is a block diagram illustrating an example of the functional configuration of a communication device (Non-AP MLD).

FIG. 6 is a flowchart illustrating a sequence of processing performed by the communication device (Non-AP MLD).

FIG. 10 is a diagram illustrating states of multiple wireless links between communication devices and an example of frame exchange.

FIG. 11 is a diagram illustrating states of multiple wireless links between communication devices and an example of frame exchange (a second embodiment).

FIG. 12 is a diagram illustrating a comparative example of states of multiple wireless links between communication devices and an example of frame exchange.

DESCRIPTION OF THE EMBODIMENTS

Figure 5:
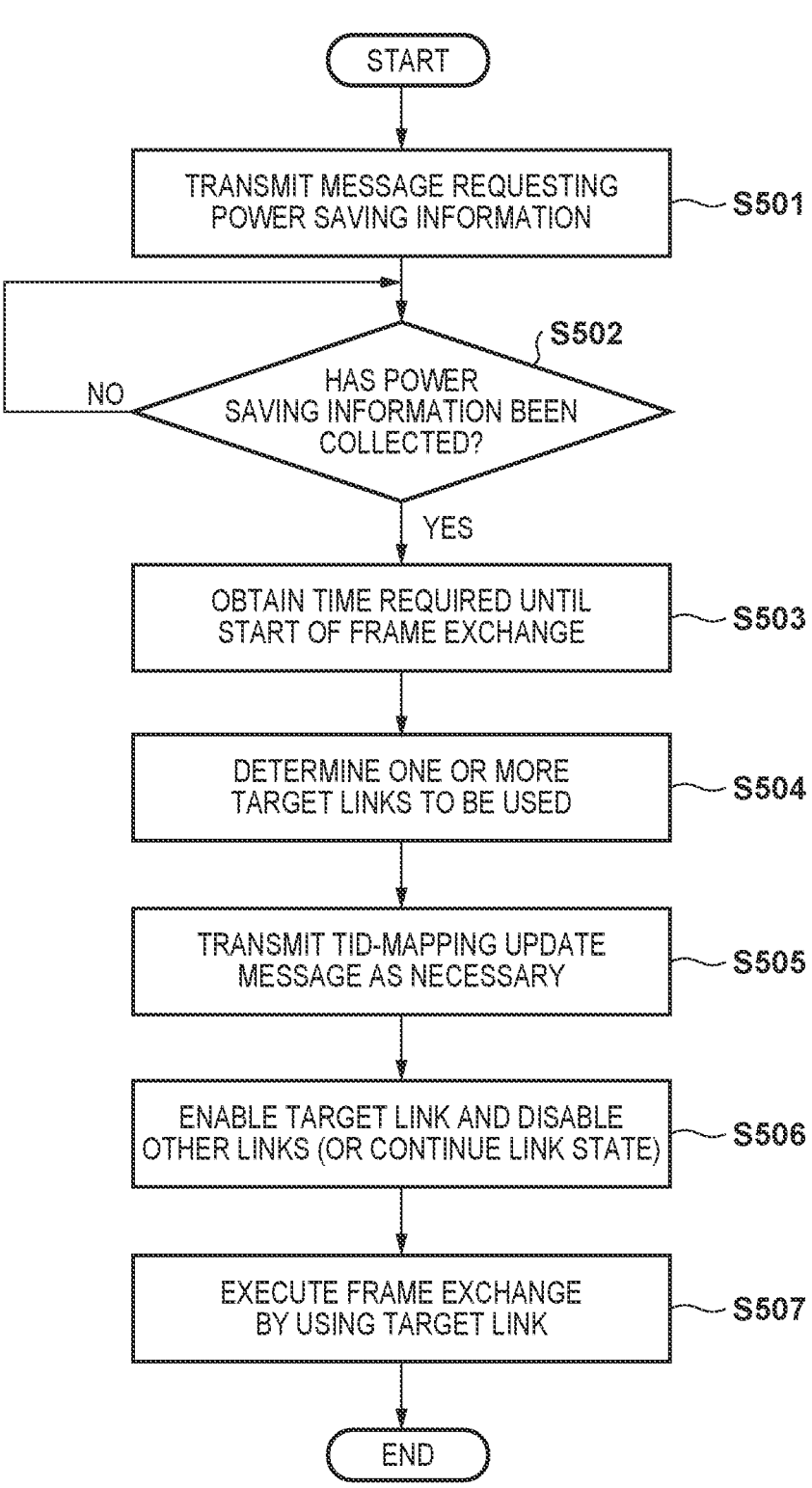
FIG. 5 is a flowchart illustrating a sequence of processing performed by the communication device (AP-MLD).

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Network Configuration>

FIG. 1 illustrates an example of a network joined by communication devices 102 and 103 according to the present embodiment. In this example, a network 101 is a wireless network, and the communication devices 102 and 103 join the network 101.

The communication device 102 is an access point (AP) that has the role of constructing the network 101. The present embodiment assumes that when the communication device 102 constructs multiple networks, the Basic Service Set Identifier (BSSID) is the same for each network, and the Service Set Identifier (SSID) used in each network is also the same. The BSSID is an identifier for identifying the network, and the SSID is an identifier for identifying the AP. In the present embodiment, the communication device 102 uses a single SSID even when multiple connections are established. The communication device 103 is a station (STA) that has the role of joining the network 101 constructed by the AP (the communication device 102). Although a network constituted by one AP and one STA is illustrated in FIG. 1, the number of APs and the number of STAs are not limited thereto.

Each communication device supports the IEEE 802.11be standard (EHT; "Extremely High Throughput" or "Extreme High Throughput") as a wireless LAN communication standard, and each is capable of executing wireless communication compliant with the IEEE 802.11be standard. In addition, each communication device is configured to be capable of performing wireless communication in multiple frequency bands (2.4 GHz, 5 GHz, and 6 GHz bands, in the present embodiment). The frequency bands that each communication device can use are not limited to these, and different frequencies may be used, such as the 60 GHz band or the like, for example. In addition, each communication device is configured to be capable of communicating using a bandwidth of 20 MHz, 40 MHz, 80 MHz, 160 MHz, 320 MHz, and the like.

The communication devices 102 and 103 can implement multi-user (MU) communication by executing Orthogonal Frequency Division Multiple Access (OFDMA) communication compliant with the IEEE 802.11be standard. Multi-user communication is communication that multiplexes the signals of multiple users. In OFDMA communication, frequency resources are allocated to each STA so that part of the divided frequency band (Resource Unit, or RU) does not overlap among STAs, and the frequency resources (carrier waves) allocated to each STA are orthogonal to each other. Accordingly, an AP (the communication device 102) can communicate with multiple STAs (the communication device 103) in parallel (simultaneously).

In the present embodiment, the communication devices 102 and 103 support the IEEE 802.11be standard, but in addition, the communication devices 102 and 103 may also support at least one legacy standard, which is a standard prior to the IEEE 802.11be standard. The legacy standards are the IEEE 802.11a/b/g/n/ac/ax standards. Note that in the present embodiment, at least one of the IEEE 802.11a/b/g/n/ac/ax/be standards is referred to as an "IEEE 802.11 series standard".

In addition to the IEEE 802.11 series standards, the communication devices 102 and 103 may support other communication standards such as Bluetooth (registered trademark), Near Field Communication (NFC), Ultra-Wide Band (UWB), Zigbee. Multi Band OFDM Alliance (MBOA), or the like. UWB includes wireless USB, wireless 1394, Winet, and the like. The communication devices 102 and 103 may further support communication standards for wired communication, such as wired LAN or the like.

<Multi-Link Communication>

The communication devices 102 and 103 are multi-link devices (MLDs) having a function for executing multi-link communication, in which multiple links (transmission paths) are established and communication is performed through multiple respective frequency channels. In multi-link communication, multiple links are established and used between an AP MLD provided with multiple APs and a Non-AP MLD (STA MLD) provided with multiple STAs. In the present embodiment, the communication device 102 operates as an AP MLD, and the communication device 103 operates as a Non-AP MLD. FIG. 1 illustrates an example where three links (link 1, link 2 and link 3) are established in parallel between the communication device 102 and the communication device 103.

In multi-link communication, the multiple links established by the communication device 102 and the communication device 103 are each established on a different frequency channel. The channel spacing of the frequency channels on which each of the multiple links is established can be at least greater than 20 MHz. Here, "frequency channel" is a frequency channel defined in the IEEE 802.11 series standard, and refers to a frequency channel over which wireless communication compliant with the IEEE 802.11 series standard can be executed. The IEEE 802.11 series standard defines multiple frequency channels in each of the 2.4 GHz, 5 GHz, and 6 GHz frequency bands. In addition, the IEEE 802.11 series standard defines the bandwidth of each frequency channel as 20 MHz. By bonding one frequency channel to an adjacent frequency channel, a bandwidth of 40 MHz or more may be used in a single frequency channel.

For example, as illustrated in FIG. 1, the communication device 102 (AP MLD) establishes link 1 with the communication device 103 (Non-AP MLD) over a first frequency channel in the 2.4 GHz band and link 2 over a second frequency channel in the 5 GHz band. This enables the communication device 102 to communicate with the communication device 103 over both link 1 and link 2. In this case, the communication device 102 maintains link 2 over the second frequency channel in parallel with link 1 over the first frequency channel. In this manner, the communication device 102 can improve the throughput in communication with the communication device 103 by establishing multiple links with the communication device 103 over multiple respective frequency channels.

Note that the communication devices 102 and 103 may establish multiple links over different frequency bands in multi-link communication. For example, the communication devices 102 and 103 may establish link 3 in the 6 GHz band in addition to link 1 in the 2.4 GHz band and link 2 in the 5 GHz band. Alternatively, the communication devices 102 and 103 may establish multiple links, each over multiple different channels in the same frequency band. The communication devices 102 and 103 may, for example, establish link 1 over channel 1 in the 2.4 GHz band and link 2 over channel 5 in the 2.4 GHz band.

In multi-link communication of the communication devices 102 and 103, multiple links in the same frequency band and links in different frequency bands may be mixed. For example, the communication devices 102 and 103 may establish link 3 over channel 36 in the 5 GHz band in addition to link 1 over channel 1 and link 2 over channel 5 in the 2.4 GHz band.

By establishing multiple connections with the communication device 103, each over a different frequency band, in this manner, the communication device 102 can communicate with the communication device 103 using other bands even when one band is congested, for example. This prevents a drop in throughput in the communication between the communication devices 102 and 103.

When performing multi-link communication, the communication devices 102 and 103 divide one piece of data and transmit the divided data to the partner device over multiple links. Alternatively, the communication devices 102 and 103 may use communication over one link as a backup communication for communication over another link by transmitting the same data over multiple links in parallel. Specifically, assume that the communication device 102 transmits the same data to the communication device 103 over link 1 on the first frequency channel and over link 2 on the second frequency channel. In this case, even if, for example, an error occurs in the communication over link 1, the communication device 103 can receive the data transmitted by the communication device 102, because the same data is being transmitted over link 2.

Alternatively, the communication devices 102 and 103 may use different links depending on the type of frame and the type of data to be transmitted. For example, the communication device 102 may transmit management frames over link 1 and data frames containing data over link 2. Note that "management frames" specifically refers to Beacon frames, Probe Request/Response frames, and Association Request/Response frames. In addition to these frames, Disassociation frames, Authentication frames, De-Authentication frames, and Action frames are also called "management frames".

The aforementioned management frames are, specifically, the following frames.

The Beacon frame is a frame used to report network information.

The Probe Request frame is a frame used to request network information.

The Probe Response frame is a frame which is a response to the Probe Request frame, and is used to provide network information.

The Association Request frame is a frame used to request a connection.

The Association Response frame is a response to the Association Request frame, and indicates connection permission, errors, and the like.

The Disassociation frame is a frame for cutting off a connection.

The Authentication frame is a frame for authenticating a partner device.

The De-Authentication frame is a frame used to suspend the authentication of a partner device and cut off the connection.

The Action frame is a frame for executing additional functions other than those listed above.

In this manner, the communication devices 102 and 103 transmit and receive management frames compliant with the IEEE 802.11 be standard (an IEEE 802.11 series standard). When transmitting data related to a captured image, for example, the communication device 102 may transmit metadata such as the date, parameters used when capturing the image (aperture value and shutter speed), location information, and the like over link 1, and pixel information over link 2.

The communication devices 102 and 103 may also be capable of executing Multiple-Input and Multiple-Output (MIMO) communication. In this case, the communication devices 102 and 103 each have multiple antennas. The transmission-side communication device transmits signals in different streams from each antenna using the same frequency channel. The reception-side communication device receives all the signals of the multiple streams simultaneously using the multiple antennas, and separates and decodes the signals of each stream. In this manner, by executing MIMO communication, the communication devices 102 and 103 can transmit and receive more data in the same amount of time than when not executing MIMO communication. The communication devices 102 and 103 may also execute MIMO communication on some links when performing multi-link communication.

The communication devices 102 and 103 may be any communication devices capable of executing multi-link communication with other communication devices. The communication device 102 can be a wireless LAN router, a PC, or the like, for example, but is not limited thereto. The communication device 103 can be a camera, a tablet, a smartphone, a PC, a cell phone, a video camera, or the like, for example, but is not limited thereto. The communication devices 102 and 103 may be information processing devices including wireless chips or the like capable of executing wireless communication compliant with the IEEE 802.11be standard. Note that an information processing device including a wireless chip includes an antenna for transmitting generated signals.

<Hardware Configuration of Communication Device 102>

FIG. 2 is a block diagram illustrating an example of the hardware configuration of the communication device 102 according to the present embodiment. The communication device 102 includes a storage unit 201, a control unit 202, a function unit 203, an input unit 204, an output unit 205, a communication unit 206, and an antenna 207. Note that the communication device 103 can have the same hardware configuration as the communication device 102.

The storage unit 201 is constituted by one or more memories such as Read Only Memory (ROM) and/or Random Access Memory (RAM). The storage unit 201 stores various information such as computer programs for performing various operations (described later), communication parameters for wireless communication, and the like. Other types of storage media, such as flexible disks, hard disks, optical disks, magneto-optical disks, CD-ROMs, CD-Rs, magnetic tape, non-volatile memory cards, DVDs, and the like, may be used for the one or more of the memories constituting the storage unit 201. The storage unit 201 may include multiple memories and the like.

The control unit 202 is constituted by one or more processors such as a Central Processing Unit (CPU) and/or a Micro Processing Unit (MPU). The control unit 202 controls the communication device 102 as a whole by reading out and executing the computer programs stored in the storage unit 201. The control unit 202 may be configured to control the communication device 102 as a whole in cooperation with the computer programs and an operating system (OS) stored in the storage unit 201. The control unit 202 may include multiple processors, e.g., multi-core, and may be configured to control the communication device 102 as a whole with using the multiple processors.

The control unit 202 generates data or signals (wireless frames) to be transmitted in communication with other communication devices. The control unit 202 further controls the function unit 203 to execute predetermined processing, such as wireless communication, image capturing, printing, projection, and the like. The function unit 203 is hardware for the communication device 102 to execute the predetermined processing.

The input unit 204 accepts various operations from a user. The output unit 205 makes various outputs to the user through a monitor screen or a speaker. Here, the output by the output unit 205 can be one or more of a display on the monitor screen, audio output through the speaker, vibration output, and the like. The input unit 204 and the output unit 205 may be implemented as a single module, such as a touch panel display. Additionally, the input unit 204 and the output unit 205 may each be configured as an integral part of the communication device 102, or separately from the communication device 102.

The communication unit 206 controls wireless communication compliant with the IEEE 802.11be standard and the like. The communication unit 206 controls the antenna 207 to transmit and receive signals for wireless communication generated by the control unit 202. The communication device 102 transmits and receives various data, such as image data, document data, video data, and the like, through communication with the communication device 103 via the communication unit 206.

Note that in addition to the IEEE 802.11be standard, the communication unit 206 may be configured to control wireless communication compliant with other IEEE 802.11 series standards, as well as wired communication over a wired LAN or the like. If the communication device 102 supports an NFC standard, a Bluetooth standard, or the like in addition to the IEEE 802.11be standard, the communication device 102 may also be configured to control wireless communication compliant with those communication standards. If the communication device 102 is configured to be capable of executing wireless communication compliant with multiple communication standards, the communication device 102 may include separate communication units and antennas for the different communication standards.

The antenna 207 is an antenna capable of communication in a predetermined frequency band (the 2.4 GHz, 5 GHz, and 6 GHz bands, in the present embodiment). The communication device 102 in the present embodiment includes one antenna, but may include separate antennas for each frequency band. If the communication device 102 includes multiple antennas, a corresponding communication unit 206 may be provided for each antenna. The antenna 207 may be provided separately from the communication unit 206 as illustrated in FIG. 2, or may be configured as a single module together with the communication unit 206.

<Functional Configuration of Communication Device 102>

FIG. 3 is a block diagram illustrating an example of the functional configuration of the communication device 102. The communication device 102 includes, as functional units, a link connection unit 301, a frame generation unit 302, a data transmission/reception unit 303, an information collection unit 304, a required time obtainment unit 305, and a link selection unit 306.

The link connection unit 301 performs connection processing for establishing one or more links used by the communication device 102 for data communication with the communication device 103. Specifically, the connection processing includes authentication processing, association processing, and four-way handshake (4WHS) processing. Upon completion of the 4WHS processing, PTK, which is an encryption key for unicast communication, and GTK, which is an encryption key for broadcast communication and multicast communication, are generated in the communication device 102 and the communication device 103, respectively. The link connection unit 301 may connect multiple links in advance when connecting to the communication device 103, or may connect another link later while communicating on a predetermined link.

The information collection unit 304 collects power saving information from each of the multiple STAs using the multiple links (e.g., links 1 to 3 in FIG. 1) that are established with the communication device 103 (Non-AP MLD). The power saving information to be collected is, for example, information indicating hardware recovery time (transition delay), the power management (PM) mode (PM mode), and power state (Power State). Note that the hardware recovery time is the time required for a corresponding STA among the multiple STAs (communication units) to recover from a power-saving state, such as a doze state, and for the STA in question to become capable of exchanging frames. The power management mode (PM mode) is used w % ben the corresponding wireless link among multiple wireless links is in an enabled state, and is either an active (Active) mode or a power save (PS) mode. The power state is the power state of the corresponding STA among the multiple STAs (communication units), and is either an Awake state or a Doze state.

The required time obtainment unit 305 obtains (calculates) the time required to enable data exchange by the hardware of the respective STAs based on the power saving information. The link selection unit 306 selects the wireless link to be used for frame exchange in the next data transmission based on the result obtained by the required time obtainment unit 305.

The frame generation unit 302 generates MAC frames, including management frames such as Authentication Request, Association Request, or the like, as well as data frames. The data transmission/reception unit 303 transmits wireless frames, including the MAC frames generated by the frame generation unit 302, and receives wireless frames from partner devices.

<Functional Configuration of Communication Device 103>

FIG. 4 illustrates the functional configuration of the communication device 103 according to the present embodiment. The communication device 103 includes, as functional units, a link connection unit 401, a frame generation unit 402, a data transmission/reception unit 403, and a power saving information notification unit 404. The link connection unit 401, the frame generation unit 402, and the data transmission/reception unit 403 have the same functions as the link connection unit 301, the frame generation unit 302, and the data transmission/reception unit 303 of the communication device 102, respectively.

The power saving information notification unit 404 makes a notification of the power saving information (transmits a notification including the power saving information) to the communication device 103 in response to an inquiry from the communication device 102 or according to a predetermined condition. The predetermined condition is, for example, that the power saving information (hardware recovery time, power management mode, power state, and the like) of the communication device 103 itself has been updated.

COMPARATIVE EXAMPLE

FIG. 12 illustrates a comparative example of the state of multiple wireless links and frame exchange between communication devices, and illustrates a comparative example of the processing described later with reference to FIGS. 5 to 10. As illustrated in FIG. 12, in the present comparative example, links 1 to 3 are established between a communication device 1 (AP MLD) and a communication device 2 (Non-AP MLD) as multiple wireless links used for data communication. The communication device 1 has AP1 to AP3 as multiple communication units, and the communication device 2 has STA1 to STA3 as multiple communication units. Link 1 is established between AP1 and STA1, link 2 is established between AP2 and STA2, and link 3 is established between AP3 and STA3.

In addition, as described below, each wireless link can switch between an enabled link state, in which frames can be exchanged over the wireless link, and a disabled link state, in which frames cannot be exchanged over the wireless link. The switch between the enabled state (the enabled link) and the disabled state (the disabled link) for each wireless link is made by updating the Traffic Identifier (TID) mapping (TID-mapping). Specifically, a message containing TID-mapping update (or TID-Map Update) information (called a "TID-mapping update message" hereinafter), transmitted from the communication device 1 to the communication device 2, is used to switch the state of each wireless link.

In the present comparative example, the notification of the power saving information is made from the communication device 2 (the STA side) to the communication device 1 (the AP side) at the timing of a switch to the enabled state through the TID-mapping update message, for each of the multiple wireless links (links 1 to 3). Note that this power saving information can include information indicating the hardware recovery time (transition delay), the power management mode (PM mode), and the power state (Power State) for the corresponding STA, as described above.

Specifically, by transmitting a TID-mapping update message 1201 from the communication device 1 to the communication device 2, the states of links 1 and 3 are switched from the disabled state to the enabled state, in addition to link 2, which is already in the enabled state. In response to this, a notification 1202 including operating parameters (the power saving information) is transmitted from the communication device 2 to the communication device 1. The communication device 1 then selects the wireless link to be used for data communication (link 1, in this example) based on the obtained power saving information, and uses a TID-mapping update message 1203 to put the selected wireless link into an enabled state and put the other wireless links into a disabled state.

In this manner, when switching a wireless link from the disabled state to the enabled state, it takes several ns to 100 ms for the corresponding STA in the communication device 2 to recover (start up) from the power-saving state, depending on the power-saving level of that STA (hardware). Accordingly, if the wireless link corresponding to an STA having a long hardware recovery time is selected as the wireless link to be used for data communication, it may take a long time for that STA to recover from the power-saving state (to switch the wireless link to the enabled state). This can cause failures or delays in data transmission from the AP-side communication device (the communication device 1) to the STA-side communication device (the communication device 2).

Additionally, for a wireless link that is not used for data communication (link 3, in the example in FIG. 12), the corresponding STA in the communication device 2 is transitioned from the doze state (the power-saving state) to the awake state by switching that STA to the enabled state for the purpose of collecting (making a notification of) the power saving information. As a result, sufficient power saving cannot be achieved in the communication device 2.

Accordingly, in the present embodiment, the communication device 103, which performs multi-link communication, can more efficiently collect power saving information related to power saving operations in a partner device (the communication device 102) by performing the processing described hereinafter.

<Power Saving Information Collection Processing and Notification Processing>

In the present embodiment, the communication device 102 (AP MLD) establishes multiple wireless links for data communication with the communication device 103 (Non-AP MLD), which is the partner device, and performs multi-link communication with the communication device 103 using the multiple wireless links that have been established. The state of each wireless link that has been established can be switched between the enabled link state (the enabled state), in which frames can be exchanged over the wireless link, and the disabled link state (disabled state), in which frames cannot be exchanged over the wireless link.

The communication device 102 collects (obtains), from the partner device (the communication device 103), the power saving information related to the power saving operations that respectively correspond to the multiple wireless links in that partner device. The communication device 102 collects the power saving information from the partner device using the wireless link, among the multiple wireless links, that is in an enabled state (the enabled link), before the start of frame exchange for the next data communication with the partner device. At this time, the communication device 102 can collect the power saving information from the partner device using the wireless link, among the multiple wireless links, that is in the enabled state, without switching a wireless link in the disabled state to the enabled state. Unlike the comparative example described above, the wireless link that is not used for data communication is no longer switched to the enabled state for the sole purpose of collecting (making a notification of) the power saving information, which enables sufficient power saving in the communication device 103.

Furthermore, the communication device 102 selects (determines) one or more wireless links, of the multiple wireless links with the partner device (the communication device 103), to be used in frame exchange for the next data communication with that partner device, based on the collected power saving information. The communication device 102 then puts the one or more selected wireless links into the enabled state, and uses the one or more wireless links to exchange frames for data communication with the partner device.

Hereinafter, the collection processing for the power saving information, performed by the communication device 102, and the notification processing for the power saving information, performed by the communication device 103, will be described in more detail with reference to FIGS. 5 to 10.

FIG. 5 is a flowchart illustrating a processing sequence executed by the communication device 102. FIG. 6 is a flowchart illustrating a processing sequence executed by the communication device 103, corresponding to the processing of the communication device 102 illustrated in FIG. 5. FIGS. 7 to 10 illustrate different examples of the states of multiple wireless links and frame exchange between the communication device 102 and the communication device 103.

In the examples in FIGS. 7 to 10, multi-link setup processing (establishment processing) is performed between the communication device 102 and the communication device 103, and three wireless links (links 1 to 3) are established. The communication devices 102 and 103 each have multiple communication units (wireless communication interfaces) that perform wireless communication with the partner device using a corresponding wireless link. In this example, the communication device 102 includes AP1 to AP3 as multiple communication units 206, and the communication device 103 includes STA1 to STA3 as multiple communication units. Link 1 is established between AP1 and STA1, link 2 is established between AP2 and STA2, and link 3 is established between AP3 and STA3. On links 1 to 3, wireless communication is performed over a first frequency channel (e.g., channel 1 in the 2.4 GHz band), a second frequency channel (e.g., channel 36 in the 5 GHz band), and a third frequency channel (e.g., a channel in the 6 GHz band), respectively.

Figure 7:
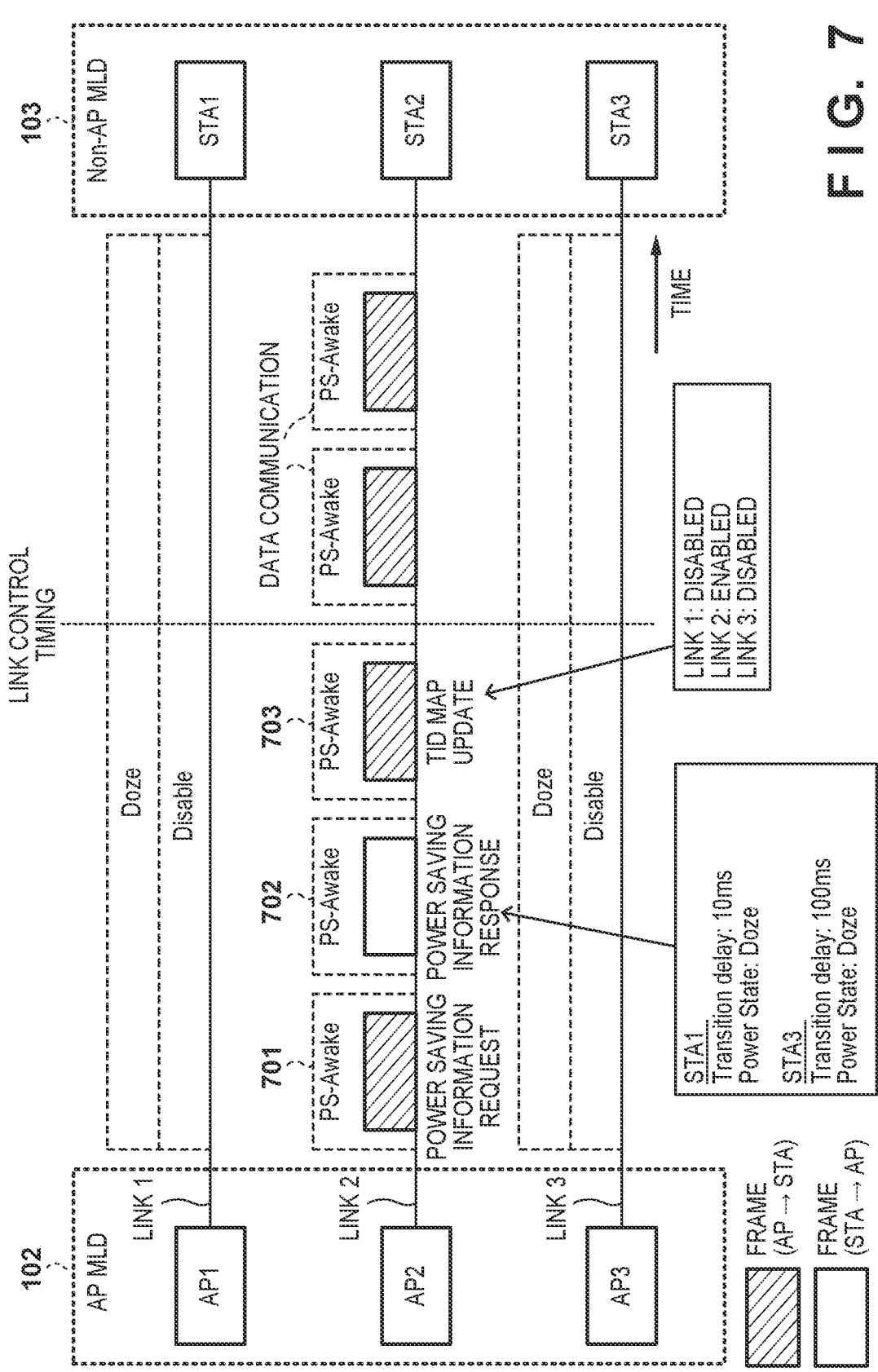
FIG. 7 is a diagram illustrating states of multiple wireless links between communication devices and an example of frame exchange.
Figure 8:
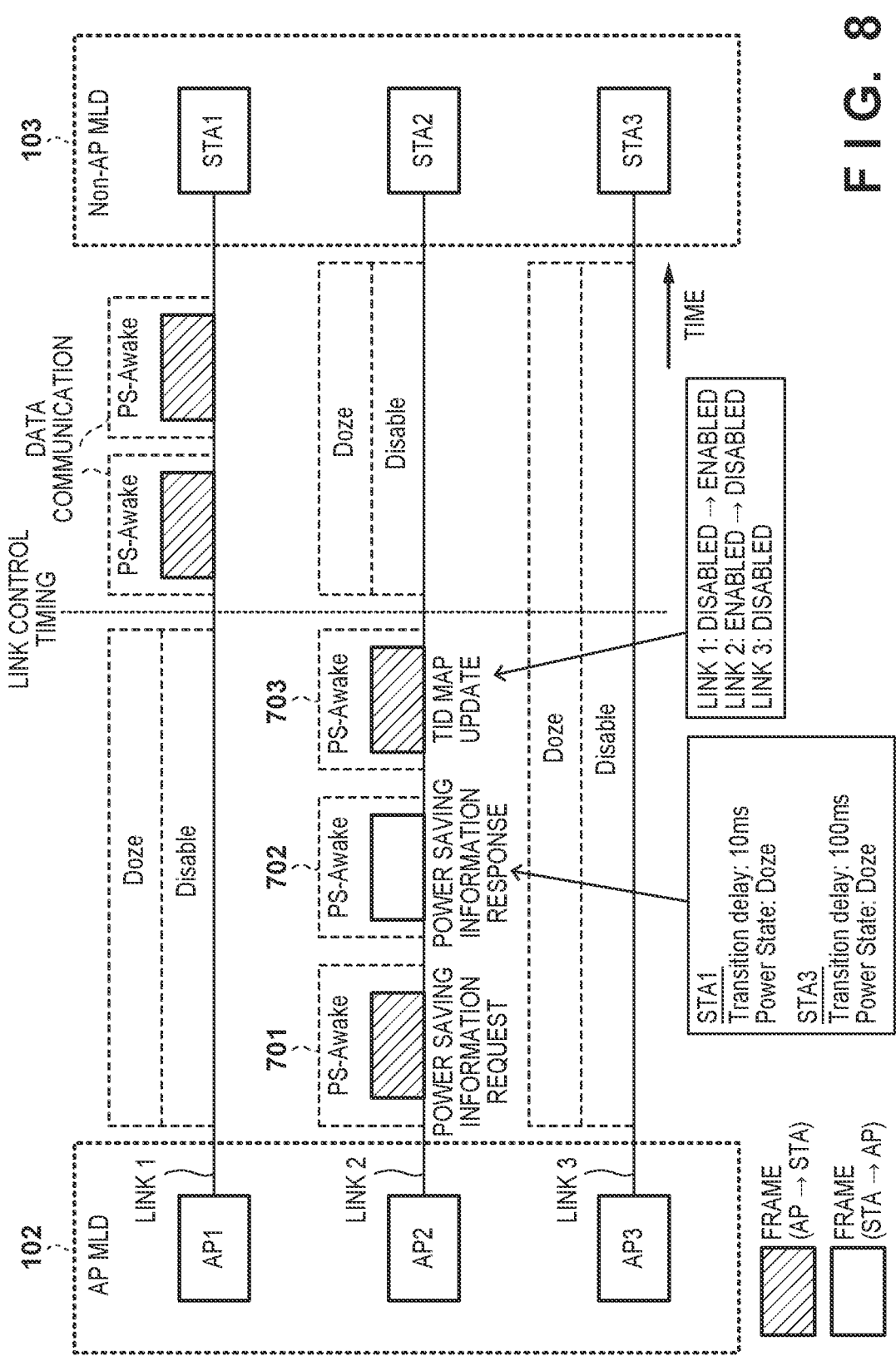
FIG. 8 is a diagram illustrating states of multiple wireless links between communication devices and an example of frame exchange.
Figure 9:
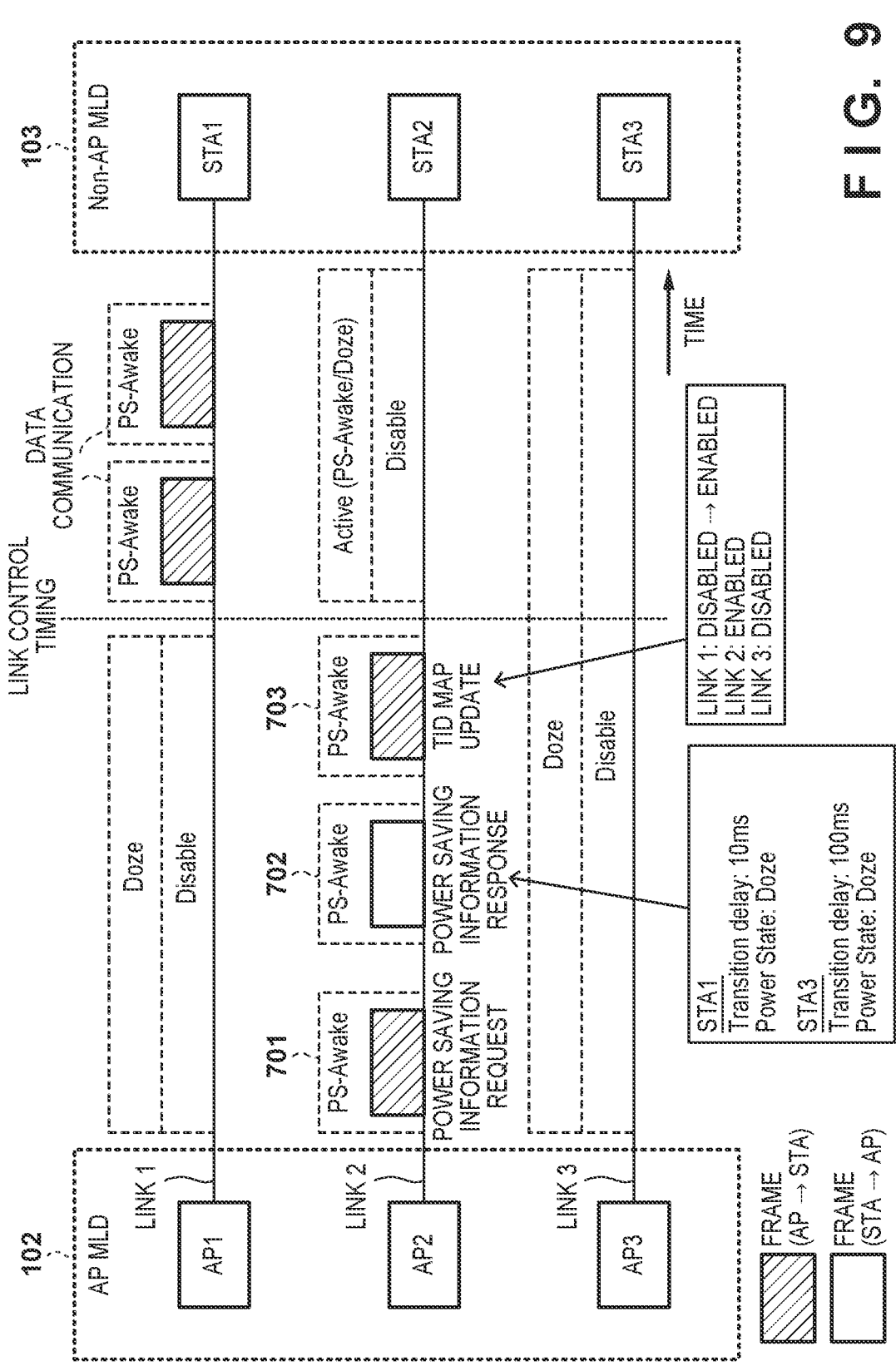
FIG. 9 is a diagram illustrating states of multiple wireless links between communication devices and an example of frame exchange.

As illustrated in FIGS. 7 to 10, in this example, only link 2 is in the enabled state, in which frames can be exchanged, and links 1 and 3 are in the disabled state, in which frames cannot be exchanged. In this case, as will be described below, the communication device 102 collects (obtains) the power saving information from the communication device 103 using link 2, and based on the obtained power saving information, selects one or more wireless links to be used in frame exchange for the next data communication. FIG. 7 illustrates an example in which link 2 is selected; FIGS. 8 and 9, in which link 1 is selected; and FIG. 10, in which links 1 and 3 are selected.

<Processing Sequence by Communication Device (AP MLD)>

The processing performed by the communication device 102 (AP MLD) (FIG. 5) will be described, referring also to the examples in FIGS. 7 to 10 as appropriate. The processing of each step in FIG. 5 can be executed by the control unit 202 in the communication device 102.

First, in step S501, the communication device 102 transmits, to the communication device 103 (the partner device), a request message 701 requesting the power saving information related to the power saving operations, respectively corresponding to the multiple links that have been established, in the communication device 103. In the examples in FIGS. 7 to 10, link 2 is in the enabled state, and thus the communication device 102 transmits the request message 701 using link 2.

Next, in step S502, the communication device 102 determines whether the power saving information has already been collected from the communication device 103. The communication device 102 receives, from the communication device 103, a response message 702 in response to the request message 701 using a wireless link in an enabled state (link 2, in this example), and collects the power saving information from the received response message. For example, the response message can include the power saving information for all of the multiple links that have already been established. In this manner, the power saving information corresponding to the wireless link, among the multiple wireless links established between the communication devices, which is in the disabled state (links 1 and 3, in this example), is collected (notified) using a wireless link in the enabled state (link 2, in this example). If the communication device 102 has already collected the power saving information from the communication device 103, the processing moves to step S503.

In the examples in FIGS. 7 to 10, the response message 702 includes the power saving information which corresponds to links 1 and 3, which are in the disabled state, and which is related to the power saving operations of STAs 1 and 3 in the communication device 103 (the partner device). This power saving information includes information indicating that for STA1 (link 1), the hardware recovery time (transition delay) is 10 ms and the power state is the doze state. This power saving information also includes information indicating that for STA3 (link 3), the hardware recovery time is 100 ms and the power state is the doze state.

Note that as will be described below, the communication device 102 may obtain the power saving information from the communication device 103 (e.g., periodically) while exchanging frames for data communication with the communication device 103. The communication device 103 may autonomously notify the communication device 102 (e.g., periodically) of the power saving information.

In step S503, the communication device 102 obtains the time required to become capable of starting exchanging frames for the next data communication with the communication device 103 (partner device) when using each wireless link, based on the collected power saving information corresponding to each STA (each link). The communication device 102 may, for example, calculate the required time based on the hardware recovery time included in the power saving information.

In step S504, based on the required time corresponding to each wireless link was obtained in step S503, the communication device 102 selects one or more wireless links, among the multiple wireless links (links 1 to 3), to be used in frame exchange for the next data communication with the communication device 103. In other words, the communication device 102 selects one or more STAs, among the STAs 1 to 3 of the communication device 103, that are suitable for the next data communication, and selects the corresponding one or more wireless links. One or more target links to be used for the next data communication (transmitting and receiving data) are determined in this manner.

As examples of the selection of wireless links in step S504, link 2 is selected in the example in FIG. 7; link 1, in the examples in FIGS. 8 and 9; and links 1 and 3, in the example in FIG. 10. In this manner, as a result of the selection of the wireless link in step S504, data communication is performed using a single link in the examples in FIGS. 7 to 9, and data communication is performed using multiple links in the example in FIG. 10. Note that if link 2 in the enabled state is selected at this time, the state of link 2 will remain as the enabled state, and link 2 will be used in the next data communication.

Next, in step S505, the communication device 102 transmits a TID-mapping update message to the communication device 103 as necessary, according to the result of the wireless link selection in step S504. In the examples in FIGS. 7 to 10, a TID-mapping update message 703 is transmitted as follows.

In the example in FIG. 7, the communication device 102 determines to use link 2 in the next data communication. Accordingly, the communication device 102 transmits the TID-mapping update message 703 in which information pertaining to link 2 is enabled and information pertaining to links 1 and 3 is disabled. In this example, link 2 continues to be used and links 1 and 3 remain in the disabled state, and thus no state change is required for any of the multiple links (links 1 to 3) when the next data communication is started. In such a case, the communication device 102 need not transmit the TID-mapping update message. In other words, the communication device 102 may transmit the TID-mapping update message only when a state change is required for one or more of the multiple established links.

In the example in FIG. 8, the communication device 102 determines to use link 1 in the next data communication. Accordingly, the communication device 102 transmits the TID-mapping update message 703 in which information pertaining to link 1 is enabled and information pertaining to links 2 and 3 is disabled.

In the example in FIG. 9, the communication device 102 determines to use link 1 in the next data communication, similar to the example in FIG. 8. However, the communication device 102 transmits the TID-mapping update message 703 enabling information pertaining to link 2 as well as link 1 such that link 2, which had been used up until that point, remains in an enabled state while data communication is carried out using link 1.

In the example in FIG. 10, the communication device 102 determines to use links 1 and 3 in the next data communication. Accordingly, the communication device 102 transmits the TID-mapping update message 703 in which information pertaining to links 1 and 3 is enabled and information pertaining to link 2 is disabled.

After the communication device 102 transmits the TID-mapping update message to the communication device 103 as necessary, the processing moves to step S506. In step S506, the communication device 102 enables the wireless link to be used for the next data communication (the target link), and disables the other wireless links that will not be used. Note that when the communication device 102 excludes the wireless link used up until that point (link 2, in the examples in FIGS. 7 to 10) from the target links, that wireless link (link 2) may be kept in an enabled state, as in the example in FIG. 9. When the processing of step S506 is completed, in step S507, the communication device 102 executes frame exchange for data communication with the communication device 103 using the target link in the enabled state, and the processing according to the sequence in FIG. 5 then ends. In the examples in FIGS. 7 to 10, link control and data communication are performed as follows.

In the example in FIG. 7, the communication device 102 determines to keep using link 2 in the next data communication. In this case, the communication device 102 keeps link 2 in the enabled state and links 1 and 3 in the disabled state, and performs the frame exchange for data communication using link 2.

In the example in FIG. 8, the communication device 102 determines to use link 1 in the next data communication. In this case, the communication device 102 switches link 1 from the disabled state to the enabled state, switches link 2 from the enabled state to the disabled state, keeps link 3 in the disabled state, and performs the frame exchange for data communication using link 2. In response to link 2 being switched to the disabled state (disabled link), the communication device 103 transitions the power state of the corresponding STA2 to the doze state, which is more power-efficient.

In the example in FIG. 9, the communication device 102 determines to use link 1 in the next data communication, similar to the example in FIG. 8. However, unlike the example in FIG. 8, link 2, which had been in use until that point, is kept in the enabled state during the data communication performed using link 1. In this case, the communication device 103 sets the power management mode to active mode or the power save (PS) mode, and transitions the power state to the awake state or the doze state, for STA2, corresponding to link 2. In this manner, the power consumption in the communication device 103 can be reduced by performing power saving operations of STA2 in the communication device 103 while keeping link 2, which is not used for data communication, in the enabled state (enabled link).

In the example in FIG. 10, the communication device 102 determines to use two wireless links, namely links 1 and 3, in the next data communication. In this case, the communication device 102 switches links 1 and 3 from the disabled state to the enabled state, switches link 2 from the enabled state to the disabled state, and performs frame exchange for data communication using links 1 and 3.

<Processing Sequence by Communication Device (Non-AP MLD)>

The communication device 103 of the present embodiment notifies the partner device of the power saving information related to the power saving operations in the communication device 103 itself, that respectively correspond to the multiple links that have already been established, before the start of the frame exchange for the next data communication with the partner device (the communication device 102).

The following will describe the processing executed by the communication device 103 (Non-AP MLD) (FIG. 6) in response to the processing of the communication device 102 illustrated in FIG. 5, while also referring to the examples in FIGS. 7 to 10 as appropriate.

First, in step S601, the communication device 103 determines whether or not a request message for power saving information (transmitted from the communication device 102 in step S501) has been received using a wireless link in an enabled state, and if the request message has been received, the processing moves to step S602. In step S602, the communication device 103 transmits, to the communication device 102, a response message including the power saving information related to power saving operations in the communication device 103 itself, that respectively correspond to the multiple links that have already been established, as a response message in response to the received request message.

In the examples in FIGS. 7 to 10, the communication device 103 receives the request message 701 from the communication device 102 and transmits the response message 702 to the communication device 102 using link 2, which is in the enabled state. At this time, the communication device 103 includes at least the power saving information corresponding to the wireless links in the disabled state (links 1 and 3, in this example) in the response message 702. In other words, the power saving information corresponding to link 2 (the power saving information related to the power saving operations of STA2) need not be included in the response message 702. The communication device 103 may include the power saving information corresponding to all of the multiple established links, including the power saving information corresponding to link 2, if a notification to the communication device 102 is required, such as when the hardware recovery time of STA2 is changed.

After transmitting the response message, in step S603, the communication device 103 starts a reception timer. The reception timer is used to stand by until the TID-mapping update message (step S505) transmitted from the communication device 102 is received. In step S604, the communication device 103 determines whether a TID-mapping update message has been received from the communication device 102 over a link in an enabled state (link 2, in this example) within a predetermined amount of time by determining whether the reception timer has timed out. When the reception timer times out (expires) (i.e., no TID-mapping update message is received within the predetermined amount of time), the communication device 103 ends the processing according to the procedure in FIG. 6. In this case, the communication device 103 continues to use the wireless link in the enabled state used for the current frame exchange with the communication device 102 (link 2, in this example) for the next data communication.

On the other hand, if the communication device 103 receives a TID-mapping update message from the communication device 102 before the reception timer times out (expires) (i.e., within the predetermined amount of time) ("YES" in step S605), the processing moves to step S606. In step S606, the communication device 103 analyzes the received TID-mapping update message and determines one or more wireless links to be used for the next data communication based on the result of the analysis and the current usage status of the multiple established wireless links (links 1 to 3).

Then, in step S607, the communication device 103 enables the wireless link to be used for the next data communication (the target link), and disables the other wireless links that will not be used. When the processing of step S607 is completed, in step S608, the communication device 103 executes frame exchange for data communication with the communication device 102 (the partner device) using the target link in the enabled state, and the processing according to the sequence in FIG. 6 then ends. In the examples in FIGS. 7 to 10, link control and data communication are performed as described above in relation to the processing by the communication device 102.

As described thus far, the communication device 102 of the present embodiment is used for wireless communication compliant with the IEEE 802.11 series standard, and establishes multiple wireless links (links 1 to 3) for data communication with the partner device (the communication device 103). The communication device 102 collects (obtains), from the partner device, the power saving information related to the power saving operations respectively corresponding to the multiple wireless links in that partner device. At this time, the communication device 102 collects the power saving information from the partner device using the wireless link, among the multiple wireless links, that is in an enabled state (the enabled link), before the start of frame exchange for the next data communication with the partner device.

Additionally, the communication device 103 of the present embodiment is used for wireless communication compliant with the IEEE 802.11 series standard, and establishes multiple wireless links (links 1 to 3) for data communication with the partner device (the communication device 102). The communication device 103 notifies the partner device of the power saving information related to the power saving operations respectively corresponding to the multiple wireless links in the communication device 103 itself. At this time, the communication device 103 performs the notification of the power saving information to the partner device using the wireless link, among the multiple wireless links, that is in an enabled state (the enabled link), before the start of frame exchange for the next data communication with the partner device.

According to the present embodiment, the communication device 102 can collect the power saving information corresponding to the wireless link in the disabled state before the start of the frame exchange for the next data communication with the partner device. This enables more appropriate selection of the wireless link to be used for data communication according to the power-saving state of the corresponding STA. As a result, failures or delays in data transmission from the AP-side communication device 102 to the STA-side communication device 103 can be avoided. Additionally, the wireless link that is not used for data communication is no longer switched to the enabled state for the sole purpose of collecting (making a notification of) the power saving information, which enables sufficient power saving in the communication device 103. In this manner, according to the present embodiment, the communication device 102, which performs multi-link communication, can more efficiently collect power saving information related to power saving operations in the partner device (the communication device 103).

Second Embodiment

The first embodiment described an example in which the communication device 102 (AP MLD) collects the power saving information from the communication device 103 (Non-AP MLD) by transmitting a request message to the communication device 103. The second embodiment will describe another example of the collection processing for the power saving information by the communication device 102 and the notification processing for the power saving information by the communication device 103. The following will primarily describe areas that are different from the first embodiment.

FIG. 11 illustrates an example of the states of multiple wireless links and frame exchange between the communication device 102 and the communication device 103 according to the present embodiment. Like the examples in FIGS. 7 to 10 in the first embodiment, in the example in FIG. 11, multi-link setup processing (establishment processing) is performed between the communication device 102 and the communication device 103, and three wireless links (links 1 to 3) are established. The communication device 102 (the communication device 103) collects (makes a notification of) the power saving information related to the power saving operations in the communication device 103, respectively corresponding to the multiple links, as will be described below, using a wireless link, among the multiple wireless links already established, that is in an enabled state.

In addition to making a notification using a response message in response to a request message from the communication device 102, the communication device 103 may be configured to make a notification of the power saving information in the manner described hereinafter. For example, the communication device 103 may make a notification of the power saving information for each STA (for each wireless link), at the end of frame exchange for data communication, or periodically during frame exchange for data communication. In response to the power saving information corresponding to each STA being updated, the communication device 103 may notify the communication device 102 of the updated power saving information using the corresponding established wireless link.

In the example in FIG. 11, the communication device 103 uses link 3 to make a notification 1103, which includes the power saving information corresponding to link 3 (STA3), to the communication device 102 before link 3 transitions to the disabled state (before STA3 transitions to the doze state). Additionally, the communication device 103 uses link 1 to make a notification 1101, which includes the power saving information corresponding to link 1 (STA1), to the communication device 102 before STA1 transitions to the doze state in PS mode (PS-Doze) while link 1 remains in the enabled state. Furthermore, the communication device 103 uses link 2 to periodically transmit a notification 1102, which includes power saving information corresponding to the link 2, to the communication device 102 periodically while frame exchange for data communication is being performed.

In this manner, the communication device 103 of the present embodiment autonomously notifies the communication device 102 of the power saving information corresponding to each wireless link under predetermined conditions. This enables the communication device 102 to even more efficiently collect the power saving information related to the power saving operations in the partner device (the communication device 103).

According to the present invention, a communication device which performs multi-link communication can more efficiently collect power saving information related to power saving operations in a partner device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-158399, filed Sep. 28, 2021, which is hereby incorporated by reference herein in its entirety.

What is claimed is:

1. A communication device comprising:
one or more processors; and
one or more memories including instructions that, when executed by the one or more processors, cause the one or more processors to perform operations comprising:
establishing multiple wireless links which are used in wireless LAN communication and which are used in data communication with a partner device, wherein a state of each established wireless link can be switched between an enabled state, in which frames can be exchanged over the wireless link, and a disabled state, in which frames cannot be exchanged over the wireless link; and
collecting, from the partner device, power saving information related to power saving operations that respectively correspond to the multiple wireless links and that are performed in the partner device, before a start of frame exchange for a next data communication with the partner device, and using a wireless link, among the multiple wireless links, that is in the enabled state,
wherein one or more wireless links of the multiple wireless links is in the enabled state for the data communication with the partner device.

2. The communication device according to claim 1, wherein the collecting comprises collecting the power saving information from the partner device using the wireless link, among the multiple wireless links, that is in the enabled state, without switching a wireless link in the disabled state to the enabled state.

3. The communication device according to claim 1, wherein the collecting comprises collecting the power saving information corresponding to a wireless link, among the multiple wireless links, that is in the disabled state, from the partner device using the wireless link that is in the enabled state.

4. The communication device according to claim 1, wherein the collecting comprises, before the start of frame exchange for the next data communication with the partner device, transmitting a request message requesting the power saving information to the partner device over the wireless link that is in the enabled state, and receiving a response message in response to the request message from the partner device, and the response message includes the power saving information corresponding to all of the multiple wireless links.

5. The communication device according to claim 1, wherein the operations further comprises selecting, based on the collected power saving information, one or more wireless links to be used in the frame exchange for the next data communication with the partner device, from among the multiple wireless links.

6. The communication device according to claim 5, wherein the selected one or more wireless links are put into the enabled state, and the one or more wireless links are used in frame exchange for data communication with the partner device.

7. The communication device according to claim 5, wherein the selecting comprises obtaining, based on the power saving information, a time required until the frame exchange for the next data communication with the partner device can be started when each of the multiple wireless links are used, and selecting the one or more wireless links based on the required time corresponding to each of the multiple wireless links.

8. The communication device according to claim 1, wherein the instructions, when executed by the one or more processors, further cause the one or more processors to perform operations comprising:

performing wireless communications between the partner device and the communication device using corresponding wireless links, wherein the power saving information includes at least information indicating:

a time required until the partner device recovers from a power-saving state and becomes capable of frame exchange;

a power management mode in a case where a corresponding wireless link, among the multiple wireless links, is in the enabled state; and a power state of the partner device.

9. The communication device according to claim 1, wherein when the wireless link is in the enabled state, the collecting comprises further collecting the power saving information corresponding to the wireless link from the partner device periodically using the wireless link.

10. A control method of controlling a communication device, the control method comprising:

establishing multiple wireless links which are used in wireless LAN communication and which are used in data communication with a partner device, wherein a state of each established wireless link is capable of switched between an enabled state, in which frames can be exchanged over the wireless link, and a disabled state, in which frames cannot be exchanged over the wireless link; and collecting, from the partner device, power saving information related to power saving operations that respectively correspond to the multiple wireless links and that are performed in the partner device, before a start of frame exchange for a next data communication with the partner device, and using a wireless link, among the multiple wireless links, that is in the enabled state, wherein one or more wireless links of the multiple wireless links is in the enabled state for the data communication with the partner device.

* * * * *